United States Patent [19]
Layton

[11] Patent Number: 5,692,384
[45] Date of Patent: Dec. 2, 1997

[54] EVAPORATIVE WATER COOLER WITH HEAT EXCHANGER IN AIR STREAM

[76] Inventor: Roy Layton, 6607 E. Jasmine, Mesa, Ariz. 85205

[21] Appl. No.: 680,617

[22] Filed: Jul. 15, 1996

[51] Int. Cl.⁶ .................................................. F25D 17/06
[52] U.S. Cl. .......................... 62/91; 62/310; 62/305; 261/160
[58] Field of Search ........................... 62/304, 305, 310, 62/309, 91; 261/158, 159, 160, DIG. 43; 165/166

[56] References Cited

U.S. PATENT DOCUMENTS

| | | | |
|---|---|---|---|
| 4,023,949 | 5/1977 | Schlom et al. | 62/309 |
| 4,380,910 | 4/1983 | Hood et al. | 62/304 |
| 4,854,129 | 8/1989 | Hickley et al. | 62/309 |
| 4,976,113 | 12/1990 | Gershuni et al. | 62/309 |

*Primary Examiner*—John M. Sollecito

[57] ABSTRACT

This invention uses an air to air heat exchanger to cool the air passing through an evaporative water cooler. This enables the evaporative water cooler to cool water to a temperature very near to the dewpoint temperature. The water so cooled may be used to remove heat from other media. One use of the cooled water is to remove heat from a habitation. This invention provides in hot arid climates a method of cooling air inside a habitation to a temperature providing comfort to the occupants at a much lower cost and at a much lower usage of electrical energy than previous methods.

1 Claim, 3 Drawing Sheets

EVAPORATIVE WATER COOLER WITH HEAT EXCHANGER IN AIR STREAM

SUMMARY

The cooling of liquid water by causing air to contact some of the water and mixing some water molecules into the air, is the process of evaporative cooling. Water which changes state from a liquid to a gas in order to join with the gasses comprising the air, removes some heat from the water remaining in the liquid state. The heat mentioned is the latent heat of vaporization. Each gram of water vaporized requires the removal of 540 calories.

Factors involved in the effectiveness of evaporative cooling include the following:

1. The temperature of the liquid water. Water tends to evaporate less easily at lower temperatures.
2. The temperature of the air.
3. The ratio of gaseous water molecules to other molecules in the air.
4. The movement of air molecules relative to the liquid surface.

A common evaporative cooler used to reduce the temperature of an inhabited area, utilizes the air stream exiting from contact with the liquid water. The mentioned contact usually occurs as the air moves through small spaces in a layer of loosely joined wettable material such as wood shavings, shredded paper or some other wettable material. The air so used is cooled by conduction with the surface of the unvaporized liquid water. It has been found through examination that the temperature of the liquid water being recycled through the wettable material in a common evaporative cooler, operating normally, may be several degrees cooler than the temperature of the air stream. The air remains at a higher temperature than the water because conductive heat transfer to the liquid water from the air stream cannot be completed during the limited contact which occurs in this process.

The air stream from an evaporative cooler used for cooling a habitation is usually introduced through one or more openings in the habitation and allowed to exit through one or more other openings. The improvement in comfort level for the inhabitants depends upon the immediate effectiveness of the evaporative cooler as determined by factors which include those listed above. It has been observed that the use of evaporative cooling, as described, for inhabitants of hot arid climates is sometimes acceptable to those inhabitants but is often considered inadequate. These inadequacies are often endured because the common alternative method of habitation cooling, while usually providing a more comfortable environment, is more expensive to manufacture and to operate. Air conditioning, the cooling method referred to, is a Carnot cycle refrigerator using a phase changing substance such as Freon.

Air conditioning used for habitation cooling usually recirculates the air inside the habitation. Heat is removed by passing some of that air through a heat exchanger called an evaporator which includes the vaporization phase change apparatus of the Carnot cycle refrigerator. Heat acquired by the vaporizing substance is transferred to outside air being passed through another heat exchanger called a condenser, which includes the liquefaction phase change apparatus of the Carnot cycle refrigerator. Electrical energy is usually used to perform the work required to move the phase changing substance from the evaporator to the condenser. The amount of energy required to remove a quantity of heat from a habitation is much greater using a Carnot cycle refrigerator than the amount of energy required to move the same quantity of heat using an evaporative water cooler.

The invention disclosed by this specification provides, in hot arid climates, habitation cooling as comfortable as air conditioning while using much less electrical energy. This invention uses evaporative cooling to establish a reservoir of cooled water which may be used to remove heat from other media including air inside a habitation. The cooled water may be circulated through an air to water heat exchanger through which a portion of the habitation air is passed.

The innovation which sets this invention apart from previous products is the use of an air to air heat exchanger between the air stream entering the moist wettable material of the evaporative cooler and the air stream exiting the moist wettable material. The use of the mentioned heat exchanger effectively removes heat from the air used for evaporation so that less heat is transferred from the air stream to the liquid water in the moist wettable material. This allows the water to cool to a temperature which is limited only by the dewpoint of the air entering the evaporative cooler. In hot arid environments, the dewpoint may occasionally rise above the maximum temperature at which this invention will cool water satisfactorily. An adequate insulated reservoir of water, cooled during time periods of effectiveness, will provide a means to remove heat from air in a habitation during short periods of ineffectiveness.

DETAILED DESCRIPTION

Figure 1:
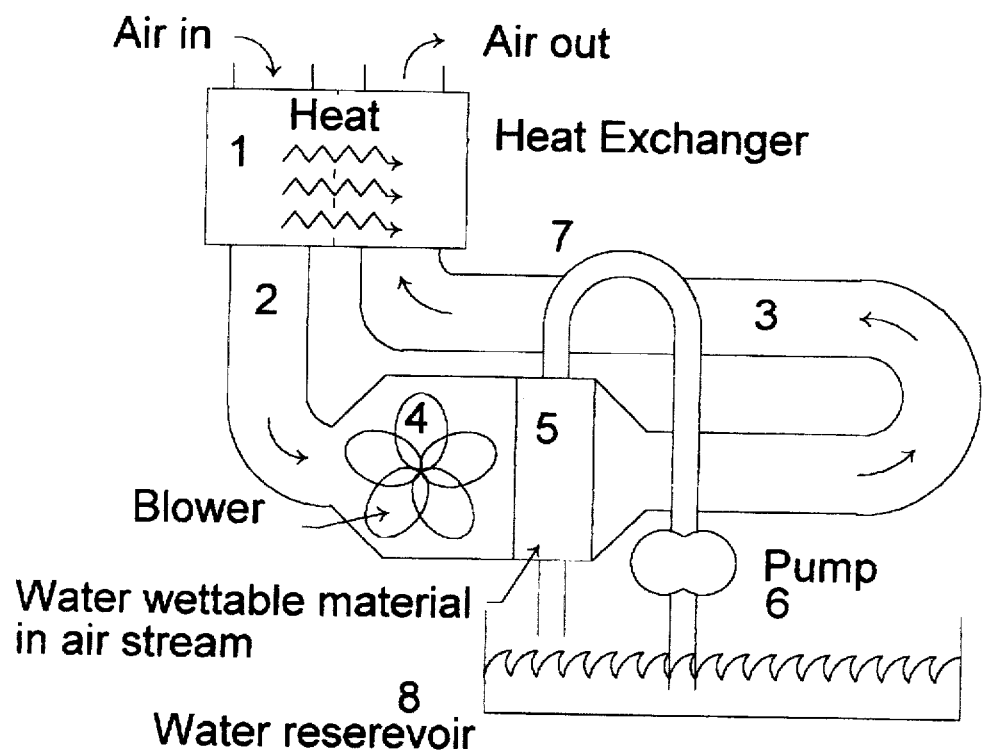
FIG. 1 illustrates the basic idea of this invention which is the combination of an air to air heat exchanger with an evaporative water cooler.

A basic explanation of this invention may be facilitated by reference to FIG. 1. An air permeable, wettable material such as excelsior or shredded paper, shown as reference number 5, is wet with water delivered by a pump, shown as reference number 6, from a water reservoir, shown as reference number 8. Air is moved through the wettable material by a blower, shown as reference number 4. The items so far mentioned comprise a common evaporative cooler. In the production of this invention a commercially available evaporative cooler may be used to provide those items so far mentioned. The air which is moved through the wettable material is drawn from the outside environment through an air to air heat exchanger, shown as reference number 1, through a passageway, shown as reference number 2. After moving through the wettable material, the air travels through another passageway, shown as reference number 3, through the air to air heat exchanger, then returns to mix with the outside air. The mentioned air enters the air to air heat exchanger at the temperature of the outside environment. As the air travels through the heat exchanger, heat is removed from the incoming air and added to the outgoing air. As the incoming air leaves the heat exchanger, its temperature has been reduced to nearly the same temperature as the outgoing air as it leaves the wettable material.

As the air passes through the wettable material, some of the water vaporizes and in doing so, removes heat from the water which remains liquid. The air is cooled by transferring heat to the liquid water in the wettable material. The air entering the wettable material has been cooled during passage through the air to air heat exchanger and is at a temperature only slightly greater than the temperature of the liquid water. Only a small amount of heat is available for transfer to the liquid water. Under the mentioned circumstances, if the air entering the wettable material is above the dewpoint temperature, vaporization will occur and the temperature of the water will decrease. The water may be cooled to very nearly the dewpoint temperature.

Figure 2:
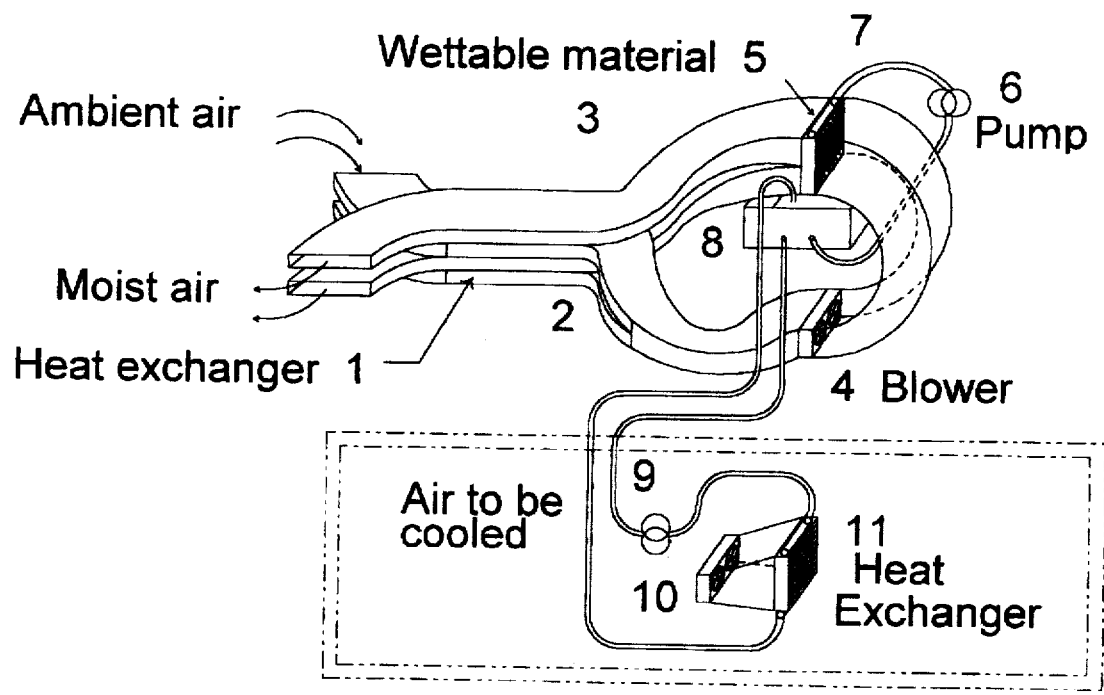
FIG. 2 is another illustration of the idea of this invention with the addition an application.

FIG. 2 depicts the same items as previously mentioned using the same reference numbers and adds a depiction of the use of water cooled through operation of this invention to remove heat from a habitation. Water from the reservoir shown as reference number 8 is passed through an air to water heat exchanger, shown as reference number 11, which is inside the habitation. Air from inside the habitation is passed by a blower, shown as reference number 10, through the air to water heat exchanger, which cools the air by conduction. Operation of pumps and blowers which pertain to this invention may be controlled using well established methods and materials such as temperature sensors, thermostats and relays to maintain an air temperature inside a habitation which may be acceptable to the occupants of the habitation.

Effective performance by this invention requires a suitable air to air heat exchanger between the air stream entering and the air stream exiting the invention. A heat exchanger of any design, construction method or materials may be included in realization of this invention. The following description is presented as an example only and places no restrictions on the scope of this invention.

Figure 4:
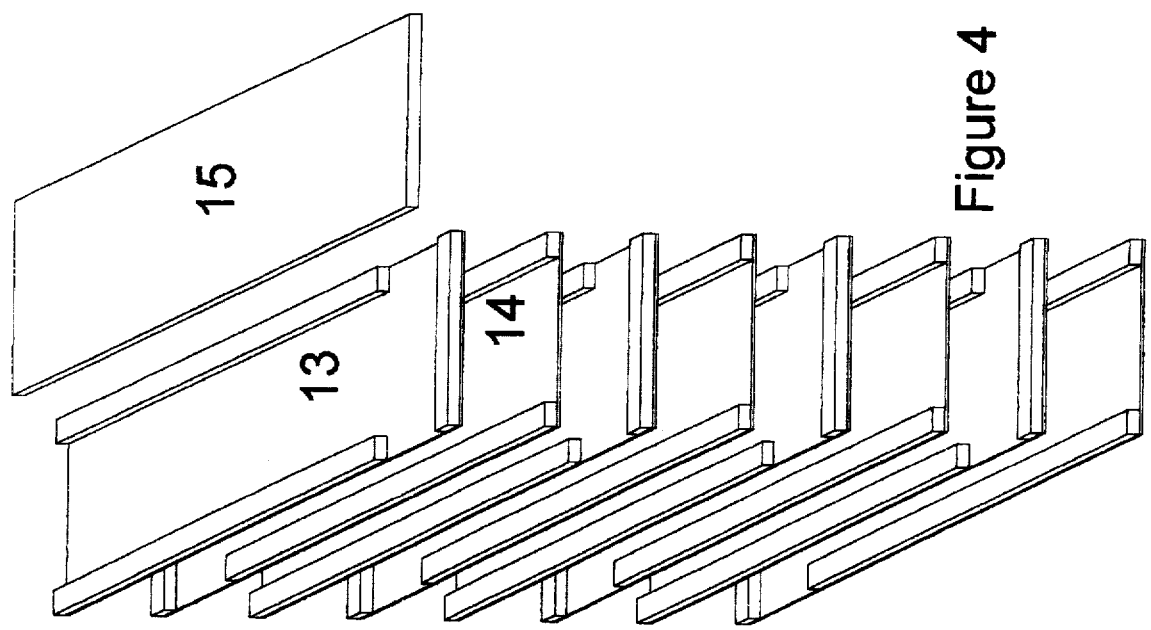
FIG. 4 demonstrates the assembly of the heat exchanger mentioned above.
Figure 3:
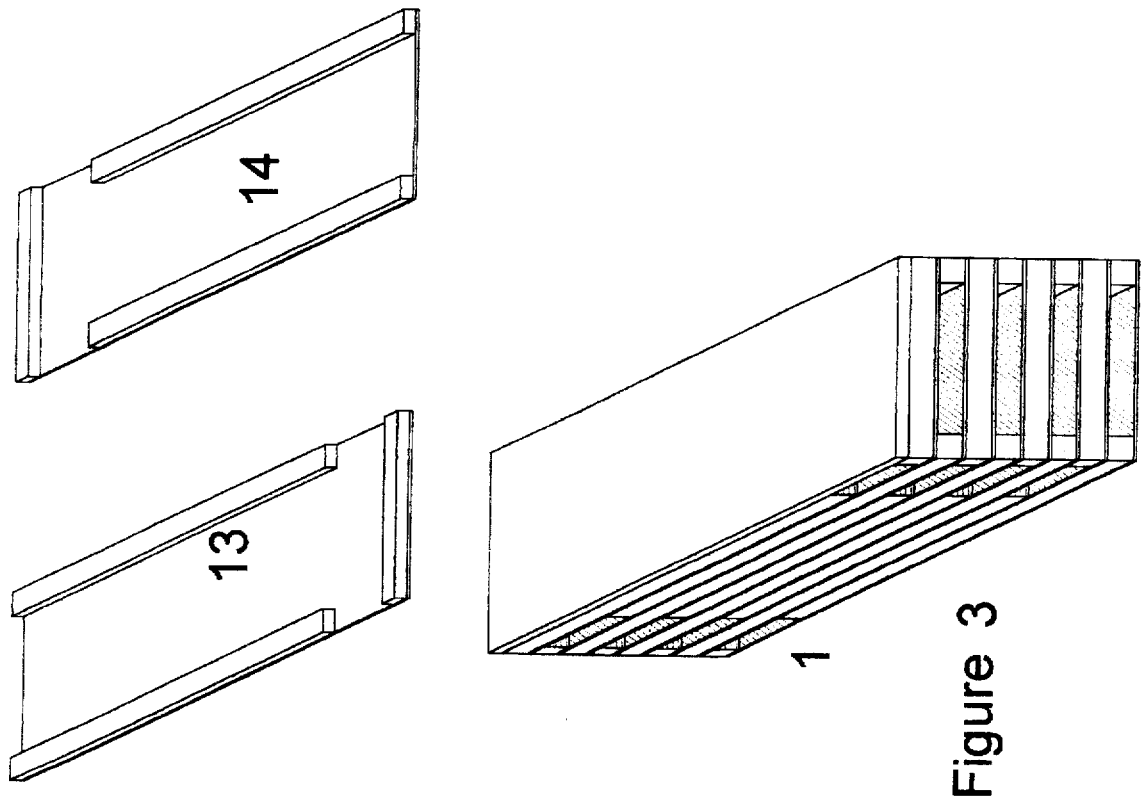
FIG. 3 is an unscaled illustration of one type of air to air heat exchanger suitable for inclusion as part of this invention.

The construction of one suitable heat exchanger may be seen by referring to the unscaled illustrations identified as FIG. 3 and FIG. 4. All dimensions mentioned in this description are those used in the initial application of this invention and may vary. All materials mentioned in this description are those used in the initial application of this invention. Any suitable materials may be used in the construction and application of this invention. The item shown as reference number 13 represents one subassembly of the heat exchanger. The subassembly consists of a sheet of aluminum, 3 strips of compressed wood fiber board and a suitable adhesive. In this example, the aluminum sheet is 8 feet long, 20 inches wide and 0.03 inches thick. Strips of compressed wood fiber board are attached with adhesive along 2 edges of the aluminum sheet as shown. Each fiber board strip is 85 inches long, 0.75 inches wide and 0.25 inches thick. During assembly, the first fiber board strip is attached with one end in alignment with one end of the aluminum sheet and with one edge aligned with an edge of the aluminum sheet as shown. Another similar fiber board strip is attached with one end in alignment with the same end of the aluminum sheet as the first fiberboard strip but at the opposite edge of the aluminum sheet. A third fiberboard strip which is 20 inches long, 0.75 inches wide and 0.25 inches thick is attached as shown with one edge in alignment with other end of the aluminum sheet.

The item shown as reference number 14 represents a subassembly similar to that represented by reference number 13 but rotated 180 degrees. The heat exchanger is assembled by stacking previously described subassemblies as shown by FIG. 4. Note that the position of the short fiberboard strip of each succeeding subassembly is at the end of the heat exchanger opposite that of the short fiberboard strip of the subassembly to which it is attached. Eighty subassemblies are stacked as described to form the heat exchanger. A sheet of fiberboard 8 feet long, 20 inches wide and 0.25 inches thick is attached to the top subassembly. Air forced into either end of the heat exchanger will exit through the sides of the heat exchanger near the other end. The completed heat exchanger is represented by FIG. 3 reference number 1. For clarity, only 8 subassemblies are shown.

Figure 5:
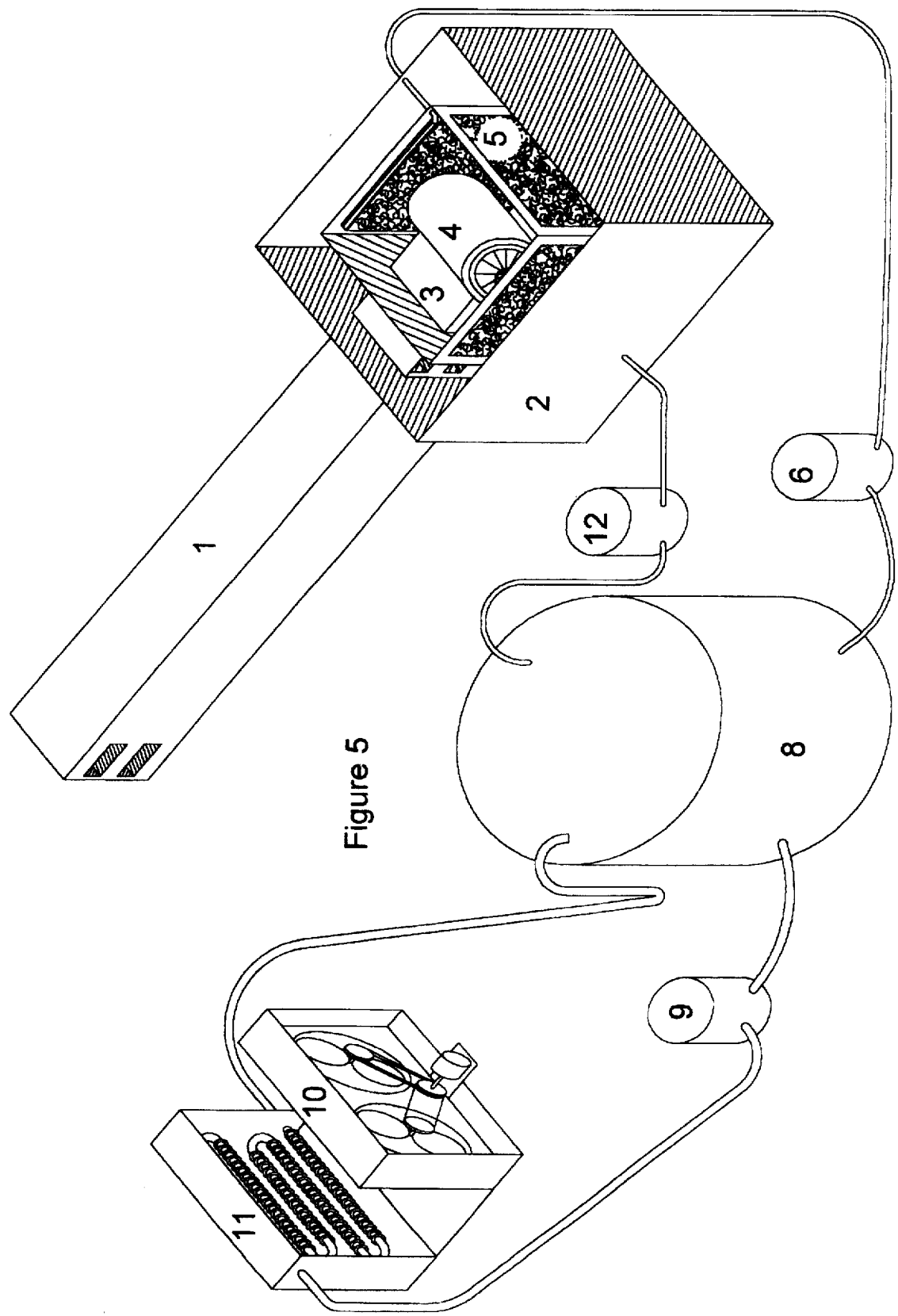
FIG. 5 is an unscaled illustration of the invention as it may be used to cool a habitation.

FIG. 5 is a general representation of essential elements of this invention configured for operation. Connections for electrical energy, control items and water supply are included using good common practice and have been omitted from FIG. 5 for clarity. Construction of this invention includes a box, shown as reference number 2, which forms a passageway for air between the air to air heat exchanger and the wettable material, formed of any suitable material such as metal, wood or plastic, with dimensions allowing enclosure of a commercially available evaporative cooler, shown as reference numbers 3, 4, and 5, with adequate space between the inside surface of the box and the evaporative cooler for air flow around the evaporative cooler. The dimensions of one such box which was incorporated into an operational example of this invention are, length 48 inches, width 48 inches and height 40 inches. Six pieces of plywood are used. The bottom and top (Not shown) each measure 48 inches by 48 inches by 0.75 inches. the 4 sides each measure 48 inches by 40 inches by 0.75 inches. Common adhesive and fasteners are used in assembly. The top is easily detachable for access inside the box. An evaporative cooler is installed inside the box as shown. A suitable hole is cut in one side of the box to allow insertion of one end of the previously mentioned air to air heat exchanger with the end connected with the air outlet duct, shown as reference number 3, of the evaporative cooler. A water reservoir shown as reference number 8 is connected to the evaporative cooler using common plumbing materials and techniques. Pumps, shown as reference numbers 6 and 12 may be used to introduce to and remove water from the evaporative cooler. Note that the evaporative cooler and the mentioned box are shown without top covers which will be required for operation.

FIG. 5 reference numbers 10 and 11 depict a blower and an air to water heat exchanger respectively which are installed inside a habitation. During normal operation water from the reservoir, shown as reference number 8, is circulated through the air to water heat exchanger using common plumbing materials and techniques by a pump, shown as reference number 9. Air inside the habitation is moved through the air to water heat exchanger by the blower, effectively reducing the temperature of the air inside the habitation.

I claim:

1. A method of cooling air inside of a habitable enclosed space comprising:

drawing a first stream of air from the ambient surrounding the said enclosed space;

wherein the first stream of air is passed, in heat exchange relationship, through the a chamber of an air to air heat exchanger, the said first stream of air is then caused to pass to an evaporative cooler to be in contact with a quantity of water, thereby cooling by evaporation the water and the air; then the first stream of air is passed, in heat exchange relationship, through a second chamber of the air to air heat exchanger in a direction countercurrent to the air flow direction in the first chamber of the air to air heat exchanger, thereby cooling the first stream of air in the first chamber of the air to air heat exchanger before it touches the said water, and heating the first stream of air in the second chamber of the air to air heat exchanger before it is returned into the ambient surrounding the said enclosed space; the first stream of air is then expelled into the ambient surrounding the said habitable enclosed space;

the cooled water is then collected and pumped to a collection tank from which a first portion of said water is circulated through a first chamber of an air to water heat exchanger which is inside of the said habitable enclosed space, and a second portion of said water is pumped back to said evaporative cooler;

a second stream of air is dram from the body of air, which is inside of the said habitable enclosed space; wherein the second stream of air is passed, in heat exchange relationship, through the second chamber of the air to water heat exchanger, thereby cooling the second stream of air; and the second stream of air is expelled into the body of air, which is inside of the said habitable enclosed space, thereby mixing with and cooling that body of air.

\* \* \* \* \*